Patented Jan. 8, 1935

1,986,826

UNITED STATES PATENT OFFICE 1,986,826

FREE CUTTING ALLOY

Howard L. Hopkins, Cleveland, Ohio, assignor to Aluminum Company of America, Pittsburgh, Pa., a corporation of Pennsylvania No Drawing. Application September 18, 1933, Serial No. 689,890

3 Claims. (Cl. 75—1)

The invention relates to aluminum base alloys and is particularly concerned with such alloys containing copper, manganese and silicon.

An extensively used alloy of this nature contains from about 3.0 per cent to about 5.5 per cent of copper, from about 0.25 per cent to about 1.5 per cent of manganese, and from about 0.25 per cent to about 2.0 per cent of silicon, the balance being commercial aluminum. This alloy can be mechanically deformed by the well known commercial processes such as rolling, forging, drawing, or extrusion. The grain is thereby refined and the physical properties considerably improved and suitable thermal treatments have been devised to enhance the improvement. The alloy has been used for many applications among which may be mentioned airplane propellers and connecting rods for internal combustion engines.

There are, however, some applications wherein the alloy might be conveniently and profitably used were it not for an inherent disadvantage which militates against its use in these applications. Mechanical cutting operations such as drilling, shaping, or lathe-cutting are successfully carried out only by using certain precautions which increase the cost of production and perhaps favor the choice of another alloy which can be machined more readily but which is in other respects, for instance in physical properties, not so desirable. When alloys are difficult to machine this disadvantage becomes evident in many cases through rapid wear of the cutting tool edge which necessitates frequent resharpening. In such cases where machining is difficult, continual lubrication is required, the machined surface is rough and irregular, and the chip has a tendency to form continuous curls or spirals that may foul the tool or the operating parts of the machine. The desirability is immediately apparent of an alloy of good working characteristics, and outstanding physical properties, yet possessing favorable machining qualities so that finish machining operations may be performed economically, successfully, and may be productive of a pleasing surface appearance.

Accordingly, an object of the invention is the production of an aluminum base alloy containing from about 3.0 per cent to about 5.5 per cent of copper, from about 0.25 per cent to about 1.5 per cent of manganese and from about 0.25 per cent to about 2.0 per cent of silicon which may be readily and economically subjected to cutting operations.

My invention resides in the discovery that this object is effected by the addition of from 0.05 to 1.5 per cent of bismuth or of bismuth and cadmium. For the purpose of my invention the elements bismuth and cadmium are substantially equivalent when used together in the same alloy by reason of the similarity in effect on the machining characteristics of the alloy.

I have found that bismuth is an alloying constituent which has a very favorable effect upon the machining properties of aluminum base alloys. Bismuth in conjunction with cadmium likewise has a beneficial influence on the machinability of aluminum alloys of the kind herein described. In this specification and in the appended claims I use the term "free machining" when applied to these constituents to indicate this advantageous effect on the machining properties, as evidenced by the fact that the alloys containing bismuth or bismuth and cadmium within the disclosed range may be machined more rapidly, with less tool wear, less tool sharpening, better quality of chip and a smoother machined surface than similar alloys not containing these elements.

Although improvement in machinability of the disclosed aluminum base alloys may be effected by the addition of from about 0.05 to 1.5 per cent of bismuth, I prefer to employ between about 0.25 and 1.2 per cent of this element. A preferred composition which exemplifies the physical properties of the base alloy and the aforesaid improved machining characteristics is an alloy containing about 4.4 per cent of copper, 0.8 per cent of manganese, 0.8 per cent of silicon and 1 per cent of bismuth, the balance being substantially all aluminum.

The simultaneous presence of bismuth and cadmium in the base alloy appears to be more advantageous in certain cases than the same total amount of bismuth. For example, the addition of about 0.5 per cent of bismuth and 0.5 per cent of cadmium simultaneously produces a more distinct improvement in the machining quality of an aluminum base alloy containing about 4.4 per cent of copper, 0.8 per cent of manganese, and 0.8 per cent of silicon, balance substantially aluminum, than the addition of about 1 per cent of bismuth. The total amount of bismuth and cadmium may vary between about 0.05 and 1.5 per cent although I prefer to use a total of from about 0.25 to 1.2 per cent of these two elements. By virtue of the superior machining quality obtained through use of both bismuth and cadmium, it is possible to attain a given degree of machinability with a smaller amount of added elements than if bismuth is used alone. This feature is of particular advantage where a restriction exists on the total amount of elements than can be present in the alloy other than those contributing to the strength or ductility of the alloy.

The tensile properties of the aluminum-copper-manganese-silicon alloys are not materially affected by the presence of bismuth. However, if cadmium is also present, there is a tendency for an increase in strength, yield point and Brinell hardness with a corresponding decrease in elongation depending on the amount employed. Through this effect of cadmium it is possible not only to improve the machining quality of the base alloy, but to increase the strength. A further advantage of our discovery lies in the fact that an alloy of high strength and hardness may be readily machined, a result not heretofore obtained in the so-called heat treated strong aluminum alloys.

The bismuth may be most conveniently added to the molten aluminum alloy in solid metallic form since it melts at a temperature considerably below that of aluminum or its alloys. If more than about 1.5 per cent of the element is to be added to the alloy, the temperature of the molten alloy should be raised above that ordinarily used in melting practice, the metallic bismuth added, and the mass thoroughly stirred to assure a uniform mixture. The method of adding bismuth to aluminum here referred to is more fully described in co-pending application, Serial No. 689,885. If cadmium is added to the alloy, the temperature at the time of making the addition and subsequent thereto should not exceed about 1400° F. to avoid excessive volatilization of the element.

The term "aluminum" used herein and in the appended claims embraces the usual impurities found in aluminum ingot of commercial grade or picked up in the course of the usual handling operations incident to ordinary melting practice.

The alloys herein disclosed may be subjected to the usual thermal treatments familiar to those skilled in the art for the purpose of improving or altering their physical characteristics.

I claim:

1. An aluminum base alloy consisting of from about 3 to 5.5 per cent of copper, from about 0.25 to 1.5 per cent of manganese, from about 0.25 to 2 per cent of silicon, and from about 0.05 to 1.5 per cent of bismuth, the balance being aluminum.

2. An aluminum base alloy consisting of from about 3 to 5.5 per cent of copper, from about 0.25 to 1.5 per cent of manganese, from about 0.25 to 2 per cent of silicon, and from about 0.25 to 1.2 per cent of bismuth, the balance being aluminum.

3. An aluminum base alloy containing about 4.4 per cent of copper, about 0.8 per cent of manganese, about 0.8 per cent of silicon, and about 1 per cent of bismuth, the balance being aluminum.

HOWARD L. HOPKINS.